United States Patent
Kruglick (12)

(10) Patent No.: US 10,380,206 B2
(45) Date of Patent: *Aug. 13, 2019

(54) SEARCH ENGINE INFERENCE BASED VIRTUAL ASSISTANCE

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 321 days.

This patent is subject to a terminal disclaimer.

(21) Appl. No.: 14/851,226

(22) Filed: Sep. 11, 2015

(65) Prior Publication Data

US 2016/0004780 A1    Jan. 7, 2016

Related U.S. Application Data

(63) Continuation of application No. 13/919,705, filed on Jun. 17, 2013, now Pat. No. 9,201,970, which is a
(Continued)

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/957* (2019.01); *G06N 5/04* (2013.01); *G10L 15/26* (2013.01)

(58) Field of Classification Search
CPC ......... G06F 17/30867; G06F 17/30899; G06F 16/9535; G06F 16/957; G06N 5/04; G10L 15/26
(Continued)

(56) References Cited

U.S. PATENT DOCUMENTS 5,745,899 A    4/1998   Burrows
5,844,415 A    12/1998  Gershenfeld et al.
(Continued)

FOREIGN PATENT DOCUMENTS

CN    1573924 A    2/2005
CN    1860544 A    11/2006
(Continued)

OTHER PUBLICATIONS

"Inbenta," Accessed at https://web.archive.org/web/20100309231117/http://www.inbenta.com/, Accessed on Jan. 22, 2015, 2015, pp. 2.
(Continued)

*Primary Examiner* — Vincent F Boccio

(57) ABSTRACT

Techniques described herein generally relate to real time inference based systems. Example embodiments may set forth devices, methods, and computer programs related to search engine inference based virtual assistance. One example method may include a computing device adapted to receive text as input and a computer processor arranged to determine at least one inference regarding subject matter of the text based on one or more web searches of one or more terms within the text. The inference(s) may then be automatically displayed upon the inference(s) being determined. The text may be automatically received as input from a voice-to-text converter as voice-to-text conversion producing the text is occurring.

20 Claims, 7 Drawing Sheets

Related U.S. Application Data continuation of application No. 13/479,676, filed on May 24, 2012, now Pat. No. 8,495,051, which is a continuation of application No. 12/724,660, filed on Mar. 16, 2010, now Pat. No. 8,214,344.

(51) Int. Cl.
  *G06F 16/957* (2019.01)
  *G06N 5/04* (2006.01)
  *G10L 15/26* (2006.01)

(58) Field of Classification Search
  USPC ......... 707/722, 759, 706; 704/246, 257, 270
  See application file for complete search history.

(56) References Cited

U.S. PATENT DOCUMENTS

| | | | |
|---|---|---|---|
| 6,029,195 A | 2/2000 | Herz | |
| 6,049,796 A | 4/2000 | Siitonen et al. | |
| 6,101,473 A | 8/2000 | Scott et al. | |
| 6,816,858 B1 | 11/2004 | Coden et al. | |
| 6,993,535 B2 | 1/2006 | Bolle et al. | |
| 6,999,932 B1 | 2/2006 | Zhou | |
| 7,107,218 B1 | 9/2006 | Preston | |
| 7,130,801 B2 | 10/2006 | Kitahara et al. | |
| 7,171,351 B2 | 1/2007 | Zhou | |
| 7,415,406 B2 | 8/2008 | Huang et al. | |
| 7,502,738 B2 | 3/2009 | Kennewick et al. | |
| 7,555,431 B2 | 6/2009 | Bennett | |
| 7,653,627 B2 | 1/2010 | Li et al. | |
| 7,729,913 B1 | 6/2010 | Lee et al. | |
| 7,761,507 B2 | 7/2010 | Herf et al. | |
| 7,769,705 B1 | 8/2010 | Luechtefeld | |
| 8,078,632 B1* | 12/2011 | Stoutamire | G06F 17/30784 707/759 |
| 9,201,970 B2* | 12/2015 | Kruglick | G06F 16/957 |
| 2002/0087312 A1* | 7/2002 | Lee | G06Q 30/06 704/251 |
| 2003/0115191 A1* | 6/2003 | Copperman | G06F 17/30976 707/999.003 |
| 2005/0210042 A1* | 9/2005 | Goedken | G06F 17/30696 707/999.1 |
| 2006/0259473 A1 | 11/2006 | Li | |
| 2008/0005091 A1 | 1/2008 | Lawler et al. | |
| 2008/0005105 A1 | 1/2008 | Lawler et al. | |
| 2008/0205775 A1 | 8/2008 | Brinker et al. | |
| 2008/0235018 A1 | 9/2008 | Eggen et al. | |
| 2008/0294625 A1 | 11/2008 | Takeuchi | |
| 2009/0144260 A1* | 6/2009 | Bennett | G06F 17/30681 707/999.005 |
| 2010/0076763 A1* | 3/2010 | Ouchi | 704/246 |
| 2011/0231379 A1 | 9/2011 | Kruglick | |
| 2012/0233146 A1 | 9/2012 | Kruglick | |
| 2013/0282692 A1 | 10/2013 | Kruglick | |
| 2018/0025010 A1* | 1/2018 | Ramer | G06F 17/3082 |

FOREIGN PATENT DOCUMENTS

| | | |
|---|---|---|
| CN | 1910654 A | 2/2007 |
| CN | 101105810 A | 1/2008 |
| CN | 101311928 A | 11/2008 |
| CN | 101477556 A | 7/2009 |
| EP | 0597630 B1 | 7/2002 |
| JP | 2005010691 A | 1/2005 |
| JP | 2007133688 A | 5/2007 |
| JP | 2007519047 A | 7/2007 |
| JP | 2009070180 A | 4/2009 |
| KR | 1020030012284 A | 2/2003 |
| KR | 1020030046494 A | 6/2003 |
| WO | 0131500 A1 | 5/2001 |
| WO | 2011115768 A3 | 9/2013 |

OTHER PUBLICATIONS

"Siri-Your Virtual Personal Assistant," accessed at https://web.archive.org/web/20100313115808/http://siri.com/, accessed on Accessed on Jan. 22, 2015, pp. 2.

Banerjee, A., and Basu, S., "Topic Models over Test Streams: A Study of Batch and on line Unsupervised Learning," In Proceedings 7th SIAM International Conference on Data Mining (SDM), pp. 12 (2007).

Haarslev,V., and Moller, R., "Racer: A Core Inference Engine for the Semantic Web," Proceedings of the 2nd International Workshop on Evaluation, pp. 27-36 (2003).

International Search Report and Written Opinion for International Patent Application No. PCT/ US2011/027390 dated Jul. 8, 2013.

Kawai, T., "Construction of Current Information Offering System Based on Individual Information," IEICE technical report—Artificial intelligence and knowledge-based processing, vol. 109, No. 439, pp. 23-28 (Feb. 22, 2010) (English Abstract).

Kawashige, T., et al., Context-Aware Web Search With Query Modification and Reranking, IEICE Data Engineering Technical Group (DEWS2006 3C-i14), pp. 1-7 (2006) (English Abstract).

Prentzas, J., et al., "A Web-Based Intelligent Tutoring System Using Hybrid Rules as Its Representational Basis," Lecture Notes in Computer Science, vol. 2363, pp. 119-128 (2002).

Sintek, M., and Decker, S., "Triple—An RDF Query, Inference, and Transformation Language for the semantic web," Lecture Notes in Computer Science, vol. 2342, pp. 364-378 (2002).

Tezuka, T., et al., "Web-Based Inference Rules for Processing Conceptual Geographical Relationships," Proceedings of the Second International Conference on Web Information Systems Engineering, vol. 2, pp. 14-21 (Dec. 3-6, 2001).

\* cited by examiner

SEARCH ENGINE INFERENCE BASED VIRTUAL ASSISTANCE

CROSS-REFERENCE TO RELATED APPLICATIONS

The present application is a continuation application under 35 U.S.C. § 120 of U.S. application Ser. No. 13/919,705, entitled "SEARCH ENGINE INFERENCE BASED VIRTUAL ASSISTANCE", filed on Jun. 17, 2013, and issued as U.S. Pat. No. 9,201,970, which is a continuation application under 35 U.S.C. § 120 of U.S. application Ser. No. 13/479,676, entitled "SEARCH ENGINE INFERENCE BASED VIRTUAL ASSISTANCE", filed on May 24, 2012, and issued as U.S. Pat. No. 8,495,051, which is a continuation application under 35 U.S.C. § 120 of U.S. application Ser. No. 12/724,660, entitled "SEARCH ENGINE INFERENCE BASED VIRTUAL ASSISTANCE", filed on Mar. 16, 2010, and issued as U.S. Pat. No. 8,214,344, the entire contents of which are incorporated herein by reference.

BACKGROUND

Unless otherwise indicated herein, the approaches described in this section are not prior art to the claims in this application and are not admitted to be prior art by inclusion in this section.

When listening to or participating in a conversation, lecture or meeting, it is often helpful to receive additional information during the particular communication session regarding the subjects or topics of discussion as they appear. However, manual web-searching and word-by-word analysis during the conversation is often inconvenient, slow and may distract the listener and also take the attention of the listener and others away from the current discussion.

SUMMARY

The present disclosure describes methods, computer readable media, and devices, for search engine inference based virtual assistance. Some example methods may comprise automatically determining inferences, comprising receiving streaming text as input to a computing device; determining, as the text is received, inferences regarding subject matter of the text based on web searches of terms within the text; and automatically displaying the inferences. Determining inferences may include analyzing results of a web search to determine a number of hits and topics of the web search results. When the number of hits returned is below a predetermined level, the results of a web search may be considered adequate to establish the topics of the web search results for the purpose of determining inferences. When the number of hits is above the predetermined level, the results of a web search may be considered inadequate and additional web searches may be performed, using increasingly larger combinations of terms from the text. Text received as input may include text produced by a voice-to-text converter, and inferences may be provided to the voice-to-text converter to aid in interpreting subsequent voice signals. Some example computer readable media may comprise computer executable instructions configured to carry out the methods described herein, and some example devices may comprise a processor and a memory coupled to the processor, the memory having computer executable instructions that, when executed, configure the processor to perform the methods described herein.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. These drawings depict only example embodiments in accordance with the present disclosure and are therefore not to be considered limiting. The disclosure will be described with additional specificity and detail through use of the accompanying drawings, in which:

DETAILED DESCRIPTION

Figure 1:
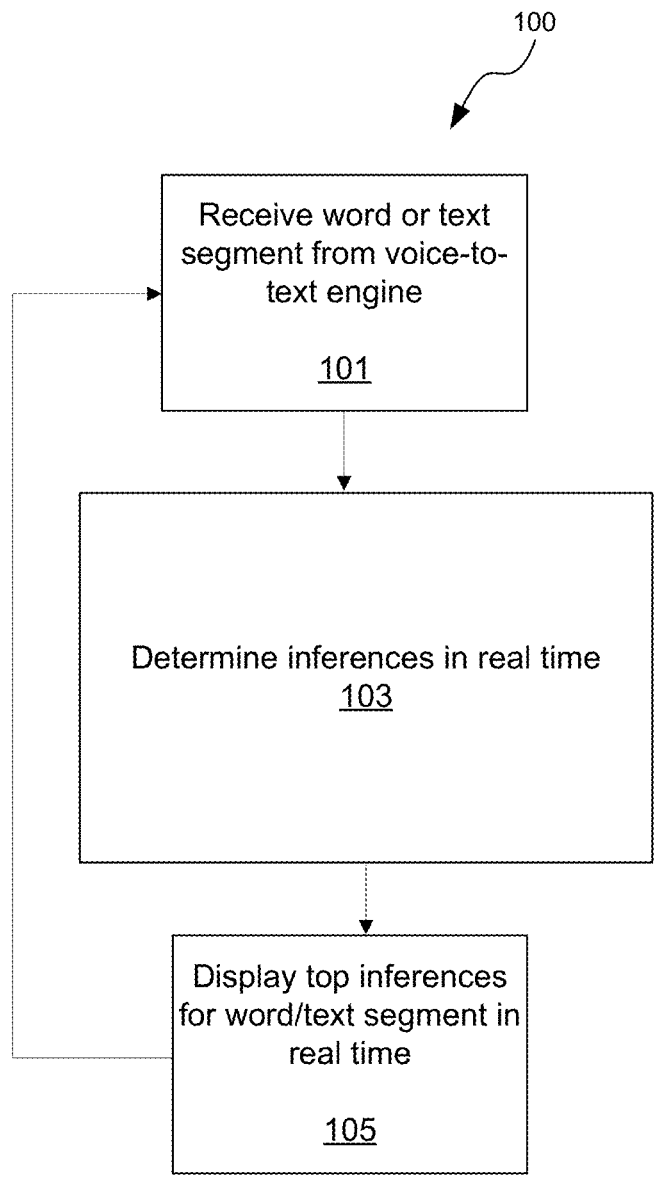
FIG. 1 is a flow chart illustrating an example process for search engine inference based virtual assistance.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

This disclosure is drawn, inter alia, to devices, methods, and computer programs related to search engine inference based virtual assistance as will be described herein.

Techniques described herein generally relate to inference based systems. Example embodiments may set forth devices, methods, and computer programs related to search engine inference based virtual assistance. One example method may include a computing device adapted to receive text as input and a computer processor arranged to determine at least one inference regarding subject matter of the text based on one or more web searches of one or more terms within the text. The inference(s) may then be automatically displayed upon the inference(s) being determined.

The present disclosure identifies and appreciates that conventional inference based systems show that one way in which additional information may be derived from discussions is to employ techniques to draw inferences about what has been discussed. However, current inference based systems are typically designed for use on existing documents in a static environment. Such systems do not apply easily to communications happening in real time and do not evolve over time or provide up-to-date meanings and extrapolations as words and contexts change.

FIG. 1 is a flow chart illustrating an example process 100 for search engine inference based virtual assistance that is arranged in accordance with at least some embodiments described herein. In the illustrated example, process 100, and other processes described herein, various functional blocks or actions that may be described as processing steps, functional operations, events and/or actions, etc., which may be performed by hardware, software, and/or firmware. Those skilled in the art in light of the present disclosure will recognize that numerous alternatives to the functional blocks shown in FIG. 1 may be practiced in various implementations. For example, although process 100, as shown in FIG. 1, comprises one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Process 100 may include one or more of operations 101, 103, and/or 105, where processing may be initiated at block 101.

At block 101, "Receive word or text segment from voice-to-text engine", a word or text segment may be received as input to a computing device. For example, this word or text segment may be captured by the computing device during a one-way or two-way voice or text communication, video conference, live chat session, streaming audio or video session, or during playback on the device of pre-recorded video or audio, etc. In cases where the communication is first received or first generated as voice, real time voice-to-text processing performed on the computing device (or performed prior to voice signal being received by the computing device) converts the voice to text such that individual words of the communication may be processed as text in the search engine inference based virtual assistance described herein. Various currently available speech recognition and voice-to-text applications and systems may be used in whole or part to provide suitable voice-to-text conversion such as, for example, those provided by Dragon Systems and Nuance Communications, Inc. Example computing devices may include desktop computers, notebook computers, mobile computing devices, smart phones, personal digital assistants (PDAs), etc. Block 101 may be followed by block 103.

Figure 2A:
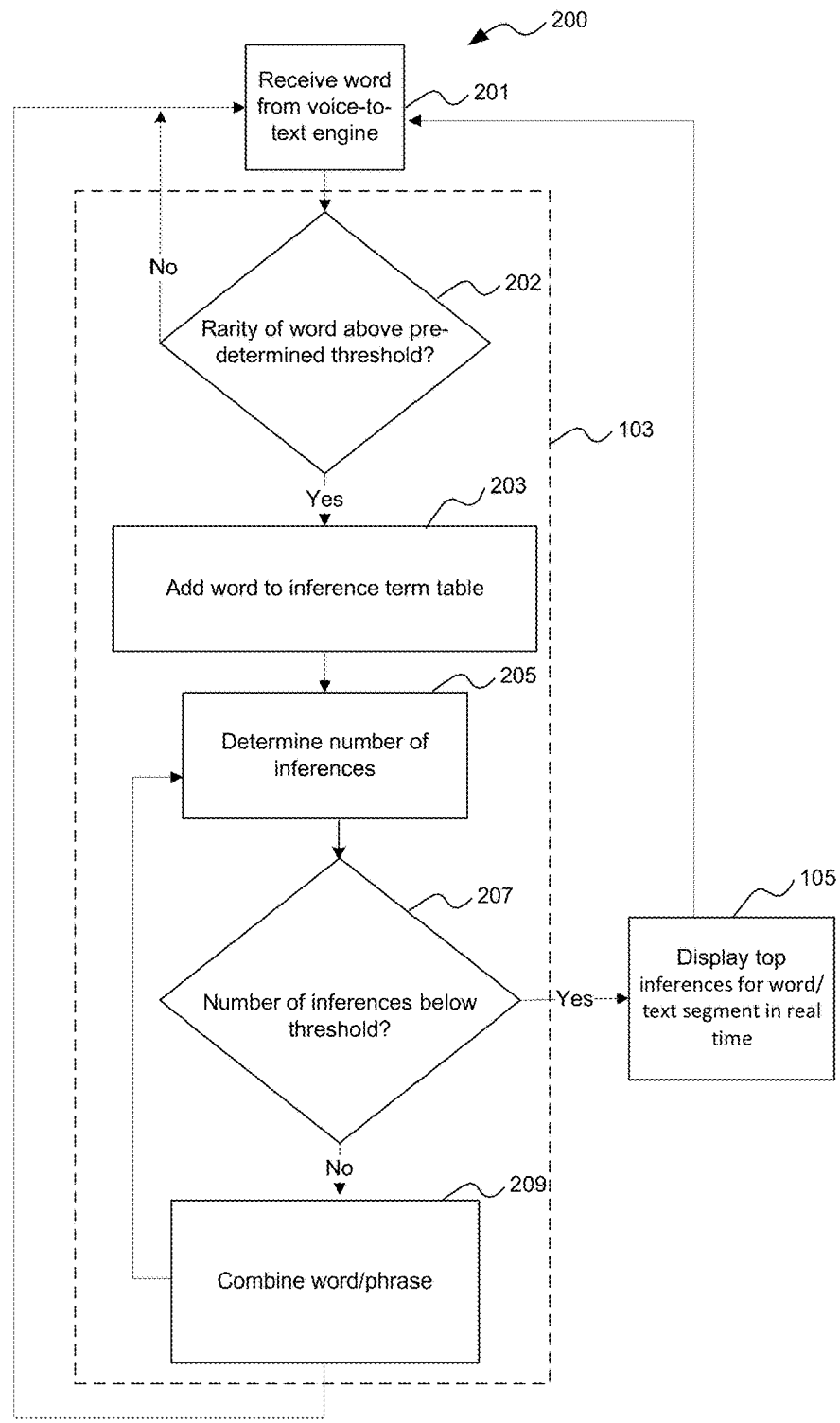
FIG. 2A is a flow chart illustrating an example process for determining inferences from words received as input to a computing device according to search engine inference based virtual assistance.
Figure 2B:
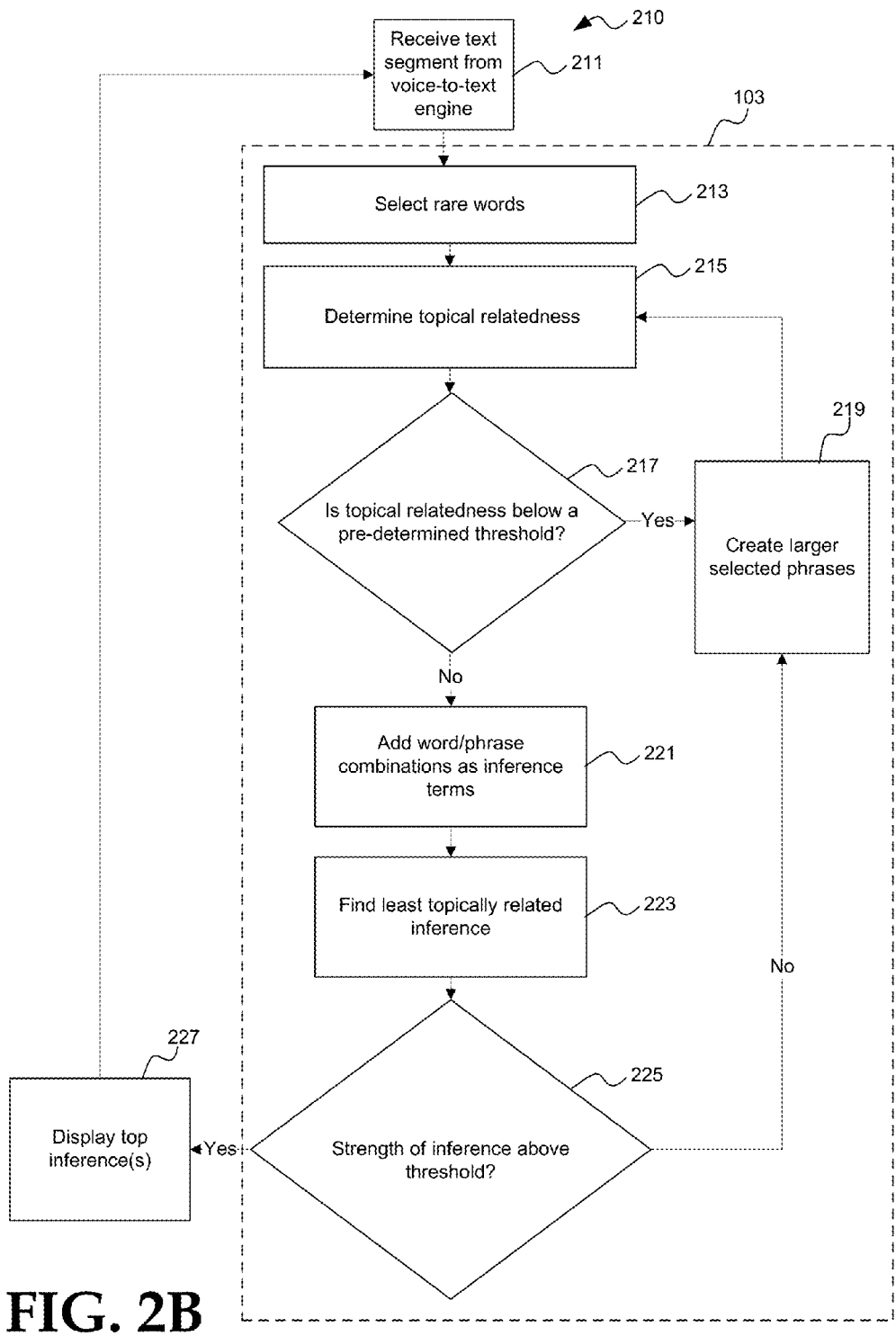
FIG. 2B is a flow chart illustrating an example alternative process for determining inferences from words received as input to a computing device according to search engine inference based virtual assistance.

At block 103, "Determine inferences in real time", one or more inferences from the word or text segment are determined 103 by a computing device in real time constraints (or near real time constraints) based on one or more web searches of the word or web searches of combinations of words within the text segment. The inferences may also be based on previous web searches made of previously received words or word segments received during the same communication session or previous communication sessions and also on the frequency of particular words or phrases appearing within the text segment and/or previous and subsequent text segments of the communication session. Example processes for determining these inferences using such web searches are shown in FIGS. 2A and 2B. Block 103 may be followed by block 105.

At block 105, "Display top inferences for word/text segment in real time", one or more top inferences for the received word and/or text segment are then displayed 105 in real time (or near real time) on the computing device. The inferences are information that may be displayed during the communication session on the computing device to provide additional or more detailed information regarding the subject or subjects of the content as it is currently being communicated to the user during the communication session. The inferences may also be communicated to and displayed on remote devices in communication with the computing device. Block 105 may be followed by block 101 when additional processing is required for additional words or text segments.

The use of a web search engine in determining inferences allows for other advanced options. For example, the search engine inference based virtual assistance system may be configurable such that highly specific terms within the communication session are removed from the web search results. Thus, if someone were discussing movie stars during the communication session and brought up the movie star's name, the search engine inference based virtual assistance system could subtract out this specific name and one would see more information on movie stars who had much in common but were not in fact related to that person in particular. In politics or business, this might allow one to provide counterexamples or other options in real time, thereby shaping a negotiation.

The web search results could also be set to target only recent results to gather material only related to very recent news. This might help one catch up on a topic that one knew about some time ago, or might help one keep up with a conversation of the communication session.

FIG. 2A is a flow chart illustrating an example process 200 for determining inferences from words received as input to a computing device during a communication session according to search engine inference based virtual assistance that is arranged in accordance with at least some embodiments described herein. In the illustrated example, process 200, and other processes described herein, various functional blocks or actions that may be described as processing steps, functional operations, events and/or actions, etc., which may be performed by hardware, software, and/or firmware. Those skilled in the art in light of the present disclosure will recognize that numerous alternatives to the functional blocks shown in FIG. 2 may be practiced in various implementations. For example, although process 200, as shown in FIG. 2, comprises one particular order of blocks or actions, the order in which these blocks or actions are presented does not necessarily limit claimed subject matter to any particular order. Likewise, intervening actions not shown in FIG. 2 and/or additional actions not shown in FIG. 2 may be employed and/or some of the actions shown in FIG. 2 may be eliminated, without departing from the scope of claimed subject matter. Process 200 may include one or more of operations 103, 201, 202, 203, 205, 207, 209, and/or 105, where processing may be initiated at block 201.

At block 201, "Receive word from voice-to-text engine", a word is received 201 from a voice-to-text engine. Block 201 may be followed by block 202. At block 202 "Rarity of word above pre-determined threshold?", as each word is received 200, it is determined 202 in real time whether the rarity of the word is above a pre-determined threshold. A word rarity score may first be applied to the word. A high word rarity score would mean the word is relatively rare while a low word rarity score would mean the word is relatively common. For example, a primary list of extremely common words (such as "if", "the" and "is") may be stored and accessed. If the word appears on the list of extremely common words, it may be ignored completely or be given a rarity score of 0, for example. If the word is not on the list of extremely common words, then a stored word rarity list with associated pre-determined word rarity scores for each word on the list may be accessed to determine whether the word appears on the word rarity list and the word's associated word rarity score.

If the word does not appear on the word rarity list, a world wide web (www) search using a web search engine (e.g., Google) may be automatically performed using the word as the search term in the web search. The number of hits returned from the search may be used as the basis of a word rarity score for the word. The fewer hits returned, the higher the word rarity score would be for that word. For example, the word "senator" may result in 68.4 million hits using that word as a search term in a web search and "Trinity University" may return 9 million hits. However, the word "tool" may return hundreds of millions of hits and therefore return a word rarity score much lower than "senator" or "Trinity University". The word and associated word rarity score may then be added to the word rarity list for future use.

If the rarity of the word is not above a pre-determined threshold (e.g., does not have a word rarity score above a pre-determined amount) then the process moves on to the next received word and the steps above are repeated for the next word. Also, the particular threshold may be user configurable through one or more user interfaces on the computing device. If the rarity of the word is above a pre-determined threshold (e.g., has a word rarity score above a pre-determined amount) then the word is marked as rare and may be joined with any neighboring adjectives or adverbs.

Block 202 may be followed by block 203. At block 203, "Add word to inference term table", the resulting word/phrase is then added 203 to an inference term table. Thus, as each word is received, one or more neighboring words may be stored in a buffer in order to combine them in such a manner. The rare words are grouped with neighboring adjectives and adverbs, even if the individual adjectives and adverbs are common. This allows one to capture the difference between "bad traffic" and "good traffic", for example, which could lead to dramatically different inferences even though the words "bad" and "good" are common enough to be discarded on their own.

Block 203 may be followed by block 205. At block 205 "Determine number of inferences", the number of and most common inferences based on using the word/phrase in a web search is then automatically determined 205. The number of inferences may be determined, for example, by using the word/phrase as a search term in a web search and analyzing the search results accordingly. For example, topics of the search results may be automatically read from the search results and used as the inferences for the word/phrase. The number of inferences may be the number of different topics found in the search results (or the number of different topics in the first n search results). The most common inferences within the search results are those appearing most often within the search results compared to other inferences within the search results. Various other automated techniques and processes for drawing inferences from analysis of web search results may be implemented as an alternative or in conjunction with those above.

Also, the strength of the inference may be determined by comparing the related inference of the search result output to the word/phrase being used as the search term. For example, if a web search on word/phrase A returns a search result output B, then B may be automatically searched to determine what proportion of search hits also involve A. If a high proportion of search hits involve A, then the strength of the inference is determined to be stronger than if a lower proportion of search hits involve A.

Block 205 may be followed by block 207. At block 207, "Number of inferences below threshold?" it is then determined 207 whether the number of inferences and/or web search result hits are below a certain threshold for the word/phrase. This determination of overall search relevance may be made based on the number of inferences determined above, the number of web search results using the word/phrase as the search term, or any combination thereof. For example, if the number of different inferences found in the search results is too high, then it may be an indication that there is a low chance any particular inference will be relevant or helpful. Also, if the number of web search results (i.e., hits) of the word/phrase is too high, then it may be an indication that the word/phrase is too common to be used by itself to determine useful inferences.

The relationship between the number of different inferences found and the number of search result hits or the proportion of different inferences found to the number of search results hits may also be used as a factor in determining whether the certain threshold is met. Also, the particular threshold may be user configurable through one or more user interfaces on the computing device.

Block 207 may be followed by block 105. At block 105, "Display top inference(s)", if the number of inferences and/or web search result hits is below the certain threshold for the word/phrase, then the top inference or inferences for the word/phrase are displayed 105 in real time constraints or near real time constraints on the computing device (see FIG. 3 as an example). The inferences may also provide links to additional information regarding the inference and may include advertisements, etc. related to the inference. The process then repeats starting with the step of also receiving 200 the next word in the communication session (e.g., form the voice-to-text engine).

Inferences may also be automatically fed back to the voice-to-text or voice recognition system to enhance the interpretation performance of such systems. For example, the English phrases "a narrow flight" and "an arrow flight" may be indistinguishable even to humans in a quiet room, but if an inference was made by the search engine inference based virtual assistance system that the speaker was just talking about Errol Flynn during the communication session, the sentence is more likely about arrows. If an inference was made by the search engine inference based virtual assistance system that the speaker was talking about Dennis Lau (an architect) the sentence is probably about stairs, which is something that may be determined based on the search relevance of the terms to each other.

Block 207 may be followed by block 209. At block 209, "Combine word/phrase", if the number of inferences and/or web search result hits is above a certain threshold for the word/phrase, then the word/phrase is combined 209 with one or more other neighboring words/phrases in the inference term table to create a larger phrase. The neighboring words/phrases may have been previously determined to be rare enough to be added to the inference term table, but perhaps did not meet the threshold by themselves to have any related inferences displayed. Also, if a neighboring word has not yet been added to the inference term table (e.g., the neighboring word is to the right of the current word phrase) then it may be read from a buffer used to store neighboring words or the process may wait until further inference terms are added to the inference term table.

For example, if the number of inferences and/or web search result hits are above a certain threshold for the word "tool", then the word is combined 209 with the neighboring word "power" in the inference term table to the left of the word "tool" to create the longer phrase "power tool".

The process then splits and automatically repeats starting with the step of determining 205 the number of and most common inferences based on using the new combined word/phrase in a web search while also receiving 201 the next word in the communication session (e.g., form the voice-to-text engine). In the example above the phrase "power tool" would be used as the search term in the web search, which ostensibly would result in a fewer number of different inferences and total search result hits than "tool" did alone. As the process continues, the word/phrases being used in the web search may continue to grow by adding neighboring words in both directions until the number of inferences and/or web search result hits are below the certain threshold for displaying the inferences or no additional words exist to combine. Alternatively, the word/phrases being used in the web search may continue to grow by only adding neighboring words either to the left or right of the current word/phrase. Also, there may be a limit placed on how large the phrase may grow before waiting for additional words to become available (e.g., spoken) during the communication session.

FIG. 2B is a flow chart illustrating an example alternative process 210 for determining inferences from words received as input to a computing device during a communication session according to search engine inference based virtual assistance, arranged in accordance with at least some embodiments described herein.

The process 210 of FIG. 2B, may be utilized, for example, for determining inferences from words received by processing one text segment at a time from streaming text rather than, as shown in the process of FIG. 2A, processing one word at a time from streaming text. The text segment may vary in size and may be selected by the user. At block 211, "Receive text segment from voice-to-text engine", a text segment may be received from a voice-to-text engine. Block 211 may be followed by block 213. At block 213, "Select rare words", once the text segment is received 211 from the voice-to-text engine or other communications application, rare words of the text segment may be joined with any applicable neighboring adjectives or adverbs (creating phrases) as described above. The rare words may be selected 213 as described above in reference to FIG. 1A by assigning word rarity scores to the words within the text segment and selecting only those words having a rarity score above a pre-determined threshold.

Block 213 may be followed by block 215. At block 215, "Determine topical relatedness", for each combination of selected words/phrases with neighboring words/phrases within the text segment, the combination's topical relatedness is determined 215 by using the combination as the search terms in a web search. Based on the number of hits received in the web search, the topical relatedness of the word/phrases in the combination may be determined 215. Generally, the lower the number of hits resulting from the web search, the lower the topical relatedness of the words/phrases in the combination.

Block 215 may be followed by block 217. At block 217, "Is topical relatedness below a pre-determined threshold?" it then may be determined 217 whether the topical relatedness of any combination is below a pre-determined threshold based on the number of hits in the search results for the combination.

Block 217 may be followed by block 219. At block 219, "Create larger selected phrases", if there are no combinations in which the topical relatedness is below a pre-determined threshold based on the number of hits in the search results, then larger selected phrases are created 219 by combining one or more neighboring words with a selected word/phrase. This process may start with the first selected word/phrase by combining it with the neighboring selected word/phrase to create a larger word/phrase for further combination. The process then repeats using the larger word/phrase combination starting with the step of determining 215 for each combination of selected words/phrases with neighboring words/phrases within the text segment, the combination's topical relatedness.

Block 217 may be followed by block 221. At block 221, "Add word/phrase combinations as inference terms", if there are any combinations in which the topical relatedness is below a pre-determined threshold based on the number of hits in the search results, then the applicable word/phrase(s) (i.e., those whose topical relatedness is below the pre-determined threshold) are added 221 as inference terms in an inference term table. An example inference term table format appears below.

|  | Word/phrase 1 | Word/phrase 2 | Word/phrase 3 | . . . |
|---|---|---|---|---|
| Word/phrase 1 | X | # of web search hits | # of web search hits | |
| Word/phrase 2 | # of web search hits | X | # of web search hits | |
| Word/phrase 3 | # of web search hits | # of web search hits | X | |
| . | | | | |
| . | | | | |
| . | | | | |

As shown in the inference term table above, each word phrase is listed across the top and side of the table. The topical relatedness of combinations of word/phrases may be automatically found in the table by looking up one word/phrase of the word/phrase combination in the column and going across the table until the column of the other word/phrase of the word/phrase combination is reached. The resulting location of the table then is one indication of the topical relatedness of the combination in terms of the number of hits in a web search of the combination. A comparatively lower number of hits for a particular combination may also serve as a general indication that the combination would have higher inference strength.

Block 221 may be followed by block 223. At block 223, "Find least topically related inference", the least topically related inference(s) for each combination of inference terms in the inference term table may then be found 223. Whether the system selects the single least topically related inference or a number of least topically related inferences may be selectable by the user. Various other automated techniques and processes for drawing inferences from analysis of web search results may be implemented as an alternative or in conjunction with those above.

Also, the strength of the inference may be determined by checking the related inference of the search result output to the word/phrase being used as the search term. For example, if a web search on word/phrase A returns a search result output B, then B may be automatically searched to determine what proportion of search hits also involve A. If a high proportion of search hits involve A, then the strength of the inference is determined to be stronger than if a lower proportion of search hits involve A.

Block 223 may be followed by block 225. At block 225, "Strength of inference above threshold?", it is then determined 225 whether the strength of the least topically related inference(s) for each combination is above a certain threshold and/or the web search of the combination returns a number of hits below a certain threshold. Whether to determine either the strength is above a certain threshold or whether the web search hits for the combination are below a certain threshold, or both, depends on the quality and accurateness desired of the inferences ultimately displayed versus the quantity of inferences desired. If both the strength is above a certain threshold and whether the web search hits for the combination are below a certain threshold are to be determined, it may increase the quality and accurateness of the inferences ultimately displayed, but may reduce the quantity of inferences displayed. The threshold levels also affects this as a higher threshold for strength and a lower threshold for the number of hits may also result in increase the quality and accurateness of the inferences ultimately displayed, but may reduce the quantity of inferences displayed. Whether to determine either the strength is above a certain threshold and/or whether the web search hits for the combination are below a certain threshold, as well as the threshold levels themselves, may be user selectable.

If the strength of inference is not above a certain threshold and/or the web search of the combination of inference terms does not return a number of hits below a certain threshold, then block 225 may be followed by block 219. The process above repeats starting with the step of creating 219 larger selected phrases by combining one or more neighboring words in the text segment with a selected word/phrase.

Block 225 may be followed by block 227. At block 227, "Display top inference(s)", if the strength of inference is above a certain threshold and/or the web search of the combination of inference terms returns a number of hits below a certain threshold, then the top inference or inferences for the word/phrase combination are displayed 227 on the computing device in real time or near real time constraints. The top inference or inferences may be determined and selected based upon the strength and commonality of the inferences as described above. The number of top inferences to display or whether to display only the top inference may also be a user configurable feature of the search engine inference based virtual assistance system.

Following block 227, the process then repeats starting with receiving 211 the next text segment from the voice-to-text engine or other communications application. However, one or more word/phrases from previously processed text segments may be left in the inference term table if so desired to increase the breadth of text being analyzed by taking into consideration word/phrases from previously processed text segments. For example, the word/phrases left remaining in the inference term table from previously processed text segments may be those that are especially rare with respect to how many web search results are returned using such word/phrases as search terms. Also, there may be a limit on the number of times the same inference is displayed that may result in using word/phrases previously added to the inference term table in combination with word/phrases from new text segments.

Figure 3:
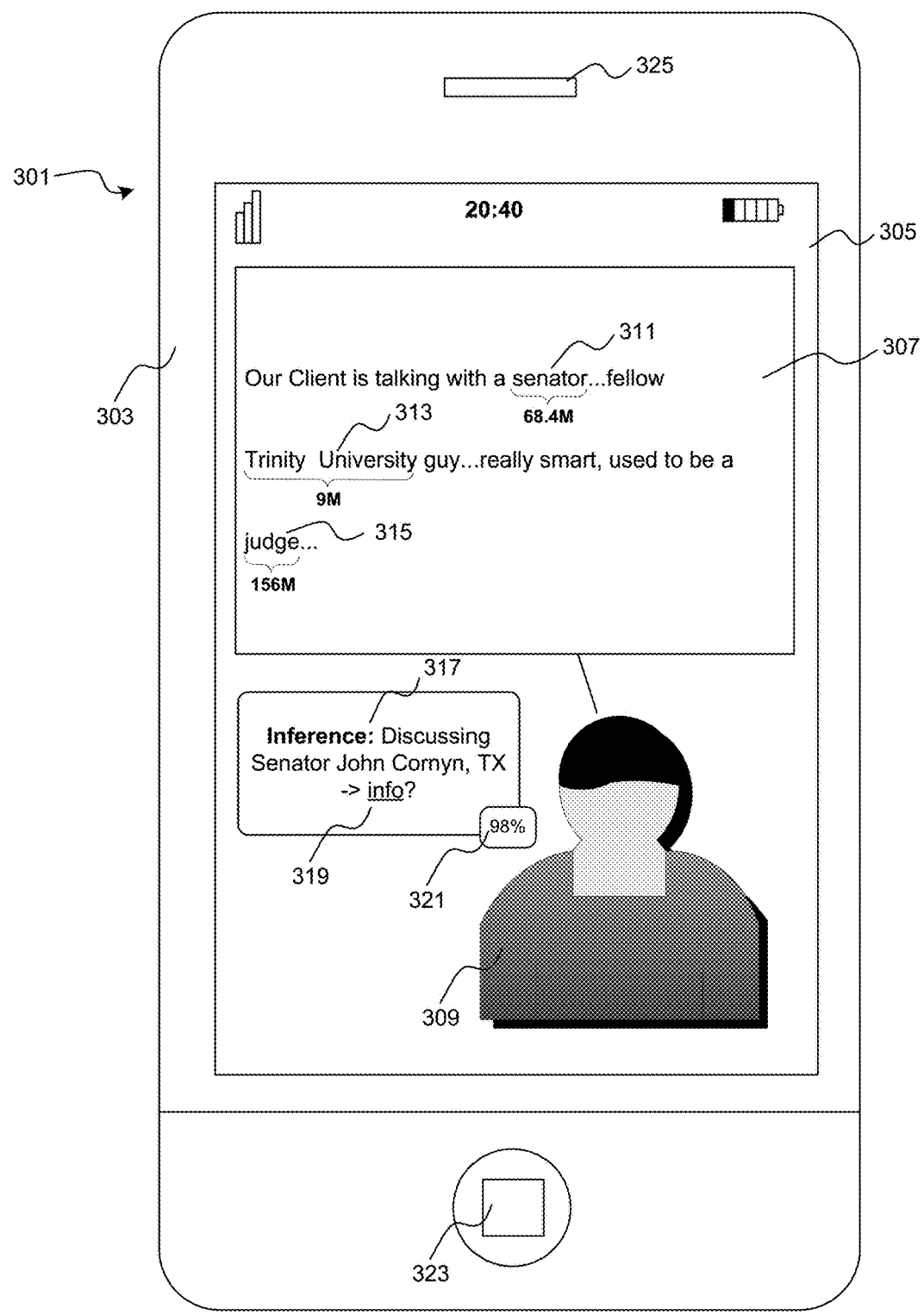
FIG. 3 is a diagram of an example mobile device displaying an example inference according to search engine inference based virtual assistance based on communication being received in real time on the mobile device.

FIG. 3 is a diagram of an example mobile device 301 displaying an example inference 317 according to search engine inference based virtual assistance based on communication being received in real time on the mobile device 301, in accordance with at least some embodiments described herein. Shown is the mobile device 301 having a mobile device housing 303, display screen 305, user input button 323, and audio output 325. The mobile device may have internal hardware, computer readable media, and appropriate applications, data and computer executable instructions stored thereon for performing various wireless communications and executing computer software program code to perform the methods and processes described herein for search engine inference based virtual assistance. Examples of such hardware and computer readable media and other suitable computing devices for performing the methods and processes described herein for search engine inference based virtual assistance are further described herein with reference to FIGS. 4 through 6.

Shown on the display screen 305 of the mobile device 301 is an example of search engine inference based virtual assistance being performed on an example communication session on the mobile device 301. The example communication session is a video chat session showing video or a still image of the remote user 309 communicating to the mobile device 301 by providing audio and video signal and/or data to the device 301. The audio signal and/or data received by the device 301 may be converted to text locally by a voice-to-text engine resident on the mobile device 301 as described above, for example, on a memory device of the mobile device that may be of any type including but not limited to volatile memory (such as RAM), non-volatile memory (such as ROM, flash memory, etc.) or any combination thereof, or may have been previously converted and then sent as text along with the audio to the mobile device 301. The corresponding text is shown streaming within a text window 307 on the display screen 305 as the remote user 309 is talking, for example. As each inference term 311, 313, 315, or combination of inference terms is identified in the search engine inference based virtual assistance processes described above, these may be highlighted, bracketed or otherwise indicated as inference terms or combinations within the text window 307. The associated number of web search hits returned using the corresponding inference term as a search term may also be displayed near the applicable inference terms 311, 313, 315 in the text window 307. For example, the inference term "senator" 311 returned 68.4 million web search hits, while the inference term "Trinity University" 313 returned only 9 million hits.

Shown is an example inference 317 being displayed on the display screen 305 in real time or near real time constraints as the communication session is occurring on the mobile device 301. The particular inference "Discussing Senator John Cornyn, TX" 317 shown on the display screen 305 below the text window 307 is a result of the inference terms "senator" 311, "Trinity University" 313 and "judge" 315 being recognized and processed in real time or near real time by the search engine inference based virtual assistance processes described above being performed on the current communication session shown on the mobile device 301. Additional information may also be displayed along with or near the inference 317 such as a link 319 to more detailed or related information regarding the inference and the relative strength 321 of the inference. Other information displayed along with or near to the inference 317 may include but is not limited to advertisements related to the inference 317, options to store or further process the inference 317 and other statistics regarding the inference 317.

Figure 4:
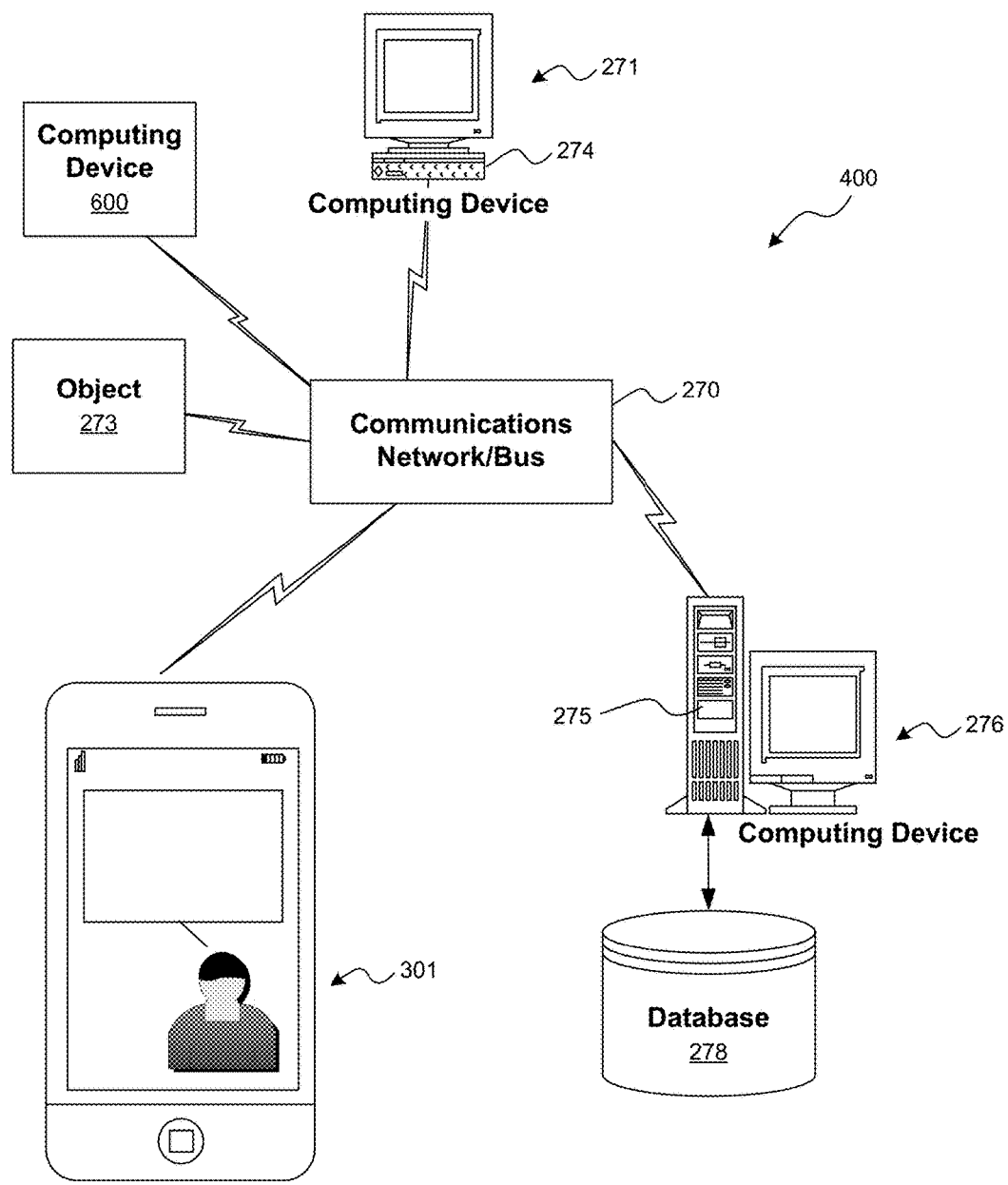
FIG. 4 is a diagram of an example networked computing environment in which aspects of search engine inference based virtual assistance may be implemented.

FIG. 4 is a diagram of an example networked computing environment 400 in which many computerized processes may be implemented to perform search engine inference based virtual assistance in accordance with at least some examples described herein. For example, a communication session as described above may be occurring between various objects in the networked computing environment shown in FIG. 4 and one or more objects in FIG. 4 may be utilizing or implementing search engine inference based virtual assistance. As another example, distributed or parallel computing may be part of such a networked environment with various clients on the network of FIG. 4 using and/or implementing systems and methods for search engine inference based virtual assistance. One of ordinary skill in the art can appreciate that networks can be utilized to connect any computer or other client or server device with other computers or other client or server devices working independently or in a distributed computing environment. In this regard, any computer system or environment having any number of processing, memory, or storage units, and any number of applications and processes occurring simultaneously is considered suitable for use in connection with the systems and methods provided.

Distributed computing may be utilized to share computer resources and/or services by exchange between various computing devices and/or systems. These resources and/or services may include the exchange of information, use of cache storage and or the use of disk storage for distributed file storage. Distributed computing may take advantage of network connectivity, allowing clients to leverage their collective power to benefit the entire enterprise. In this regard, a variety of devices may have applications, objects or resources that may implicate the search engine inference based virtual assistance processes described herein.

The networked computing environment 400 of FIG. 4 may comprise a variety of devices such as one or more computing devices 271, 600, 276, 301, one or more objects 273, 274, and 275, and/or one or more databases 278. Each of these devices 271, 600, 273, 274, 275, 276, 301 and 278 may comprise or make use of programs, methods, data stores, programmable logic, etc. Computing device 301 can be the mobile device 301 of FIG. 3. However, the devices 271, 600, 273, 274, 275, 276, 301 and/or 278 may span portions of the same or different devices such as personal digital assistants (PDAs), mobile devices, audio/video devices, MP3 players, personal computers, etc. Each device 271, 600, 273, 274, 275, 276, 301 and 278 can be adapted to communicate with another device 271, 600, 273, 274, 275, 276, 301 and 278 by way of the communications network 270. In this regard, any device may be responsible for the maintenance and updating of a database 278 or other storage element.

Communications network 270 may itself comprise other computing entities that are configured to provide services to the system of FIG. 4, and thus may represent multiple interconnected networks. In accordance with aspects of some embodiments, each device 271, 600, 273, 274, 275, 276, 301 and/or 278 may contain discrete functional program modules that might make use of an application programming interface (API), or other object, software, firmware and/or hardware, that is adapted to request services of one or more of the other devices 271, 600, 273, 274, 275, 276, 301 and/or 278.

It can also be appreciated that an object, such as 275, may be hosted on another computing device 276. Thus, although the physical environment depicted may show the connected devices as computers, such illustration is merely an example and the physical environment may alternatively be depicted or described comprising various digital devices such as PDAs, televisions, MP3 players, etc., software objects such as interfaces, COM objects and the like.

There are a variety of systems, components, and network configurations that may support distributed computing environments. For example, computing systems may be connected together by wired or wireless systems, by local networks or widely distributed networks. Currently, many networks are coupled to the Internet, which is one example that provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 4, any device 271, 600, 273, 274, 275, 276, 301 and/or 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) may be adapted to communicate with one another utilizing the functionality provided by protocol layer(s). For example, HyperText Transfer Protocol (HTTP) is a common protocol that may be used in conjunction with the World Wide Web (WWW), or "the Web." A computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 4 and the further diversification that can occur in computing in a network environment such as that of FIG. 4, the systems and methods provided herein cannot be construed as limited in any way to a particular computing architecture. Instead, the embodiments should be construed in breadth and scope in accordance with the appended claims.

Figure 5:
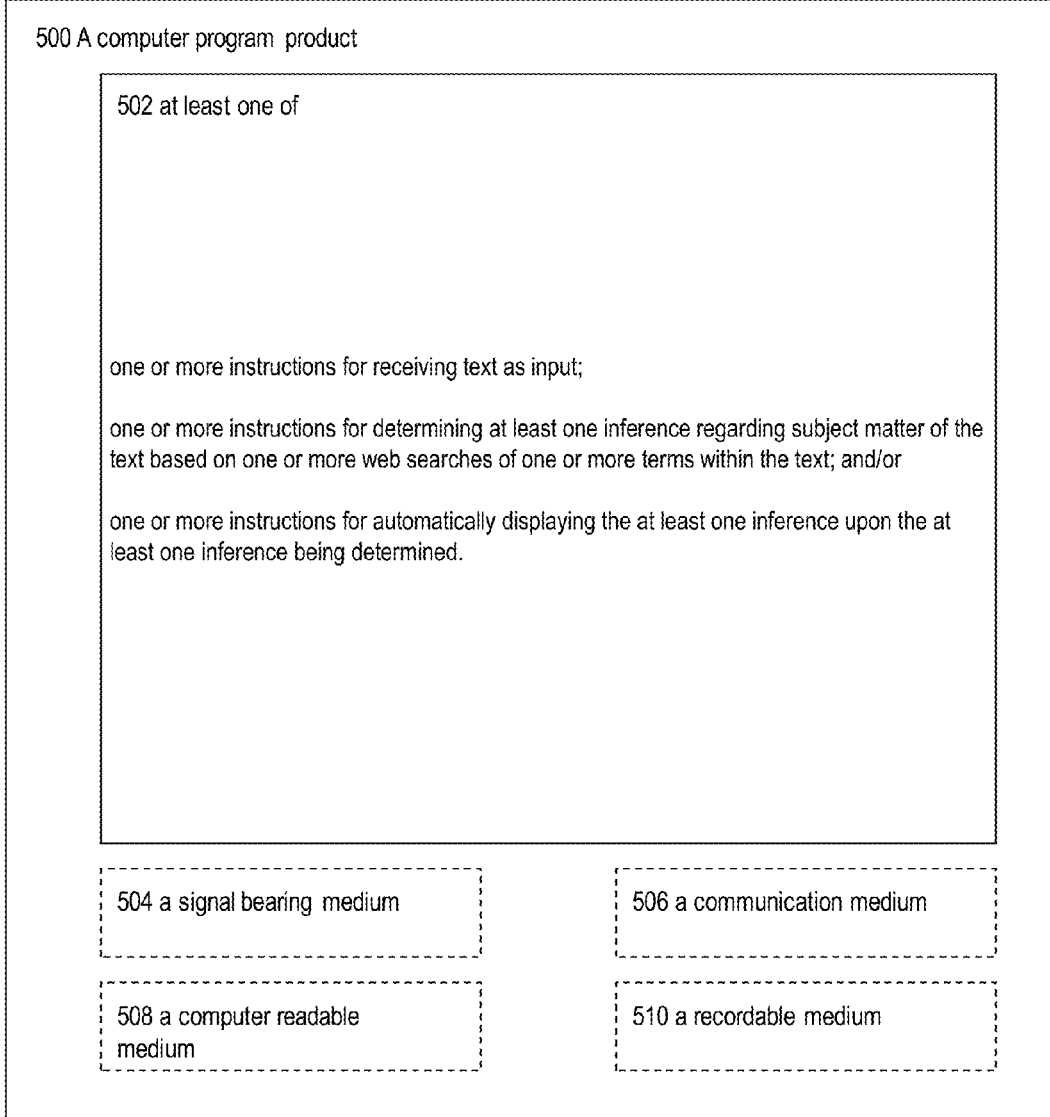
FIG. 5 is a schematic diagram illustrating a computer program product for search engine inference based virtual assistance.

FIG. 5 is a schematic diagram illustrating a computer program product for search engine inference based virtual assistance, arranged in accordance with at least some embodiments of the present disclosure. The computer program product 500 may include one or more sets of executable instructions 502 for executing the methods described above and also illustrated in FIG. 1, FIG. 2A, and FIG. 2B. The computer program product 500 may be transmitted in a signal bearing medium 504 or another similar communication medium 506. The computer program product 500 may also be recorded in a computer readable medium 508 or another similar recordable medium 510.

Figure 6:
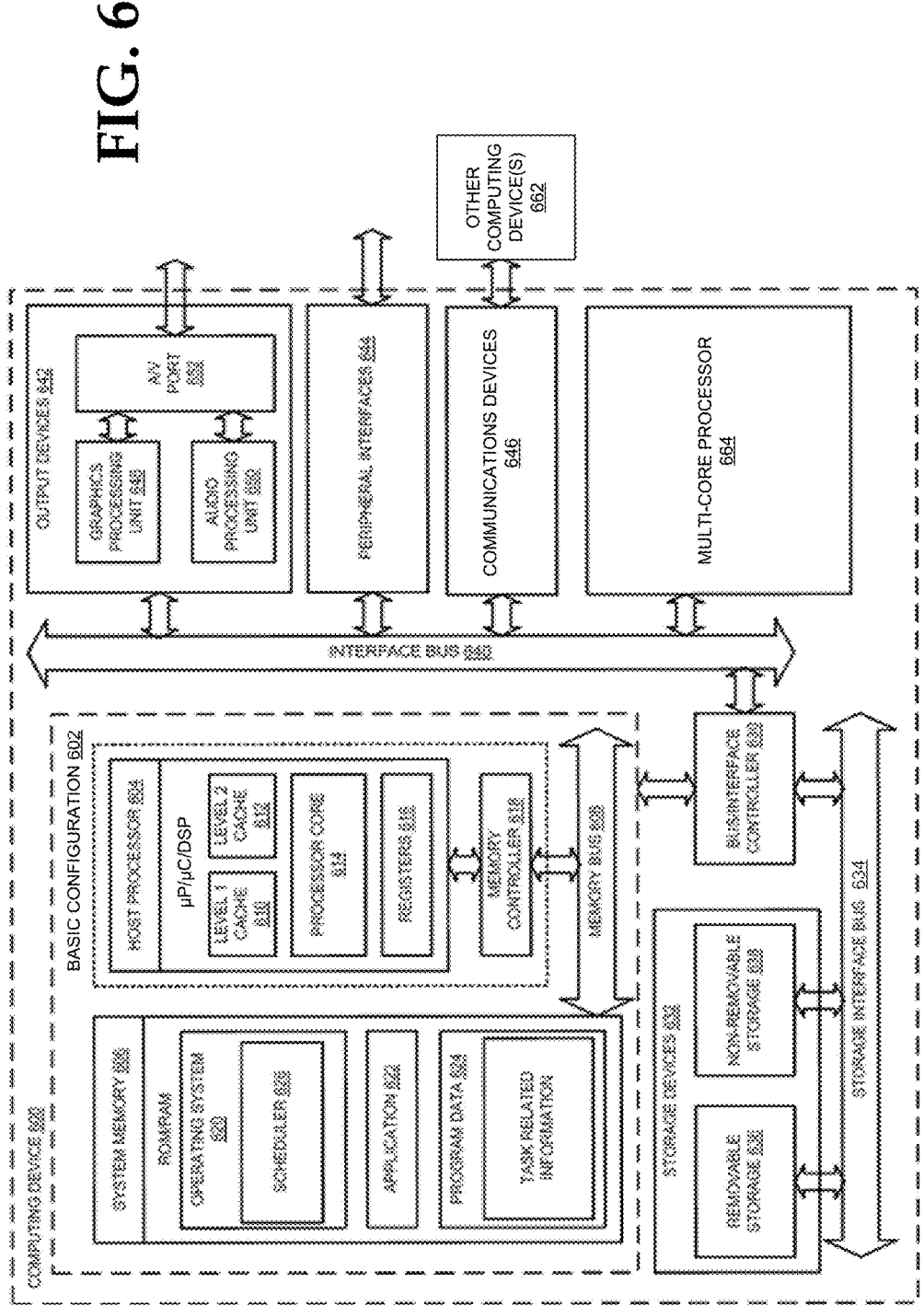
FIG. 6 is a block diagram of an example computing device on which search engine inference based virtual assistance may be implemented, all arranged in accordance with at least some embodiments described herein.

FIG. 6 is a block diagram of an example computing device on which search engine inference based virtual assistance may be implemented, arranged in accordance with at least some embodiments of the present disclosure. In a very basic configuration, computing device 600 typically includes one or more host processors 604 and a system memory 606. A memory bus 608 may be used for communicating between host processor 604 and system memory 606.

Depending on the desired configuration, host processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. In some implementations, the operating system 620 may have a scheduler 626 and be arranged to run one or more applications 622 to perform the functions as described herein including those described with respect to at least the processes shown in FIG. 1, FIG. 2A and FIG. 2B. Also, application 622 may be arranged to operate with program data 624 on operating system 620. Program data 624 may include task related information, such as, without limitation, task data related to executing instructions for performing search engine inference based virtual assistance. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disc drives such as compact disc (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller or a parallel interface controller, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller, which may be arranged to facilitate communications with one or more other computing devices 662 over a network communication link via one or more communication ports. In some implementations, computing device 600 includes a multi-core processor 664, which may communicate with the host processor 604 through the interface bus 640.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

There is little distinction left between hardware and software implementations of aspects of systems. The use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes, systems, or other technologies are deployed. For example, if an implementer determines that speed and accuracy are paramount, the implementer may opt for a mainly hardware or firmware vehicle. If flexibility is paramount, the implementer may opt for a mainly software implementation. Yet again, alternatively, the implementer may opt for some combination of hardware, software, with or without firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disc (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A computing device, comprising:
   a processor; and
   a non-transitory computer-readable storage medium coupled to the processor and having stored thereon computer executable instructions that are executable by the processor,
   wherein the computer executable instructions, in response to execution by the processor, cause the processor to perform or control performance of operations comprising:
   identify received text data related to content;
   identify a first one or more words in the received text data;
   indicate the first one or more words as a first search term, wherein a rarity score of the first one or more words meets a first threshold;
   identify a received first one or more search results of a first search performed with the first search term;
   determine whether a number of the first one or more search results meets a second threshold for a received number of first one or more search results;
   in response to a determination that the number of the first one or more search results fails to meet the second threshold for the received number of first one or more search results:
      identify a second one or more words in the received text data;
      indicate a combination of the first one or more words and the second one or more words as a second search term; and
      identify a second one or more search results of a second search performed with the second search term; and send information related to at least a portion of the first one or more search results or at least a portion of the second one or more search results.

2. The computing device of claim 1, wherein at least a portion of the information is outputted by a speaker.

3. The computing device of claim 1, wherein at least a portion of the information is outputted by a display.

4. The computing device of claim 1, wherein at least a portion of the information includes one or more links.

5. The computing device of claim 1, wherein at least a portion of the information is used to enhance performance of voice-to-text recognition.

6. The computing device of claim 1, wherein the operations further comprise:
   generate the content during a voice communication.

7. The computing device of claim 1, wherein the operations further comprise:
   generate the content during a text communication.

8. The computing device of claim 1, wherein the operations further comprise:
   generate the content during a video conference.

9. The computing device of claim 1, wherein the operations further comprise:
   generate the content during a chat session.

10. The computing device of claim 1, wherein the content is part of streamed audio data or streamed video data.

11. The computing device of claim 1, wherein the content is part of played-back audio data or played-back video data.

12. The computing device of claim 1, wherein the operations further comprise:
    generate the text data by voice-to-text recognition.

13. The computing device of claim 1, wherein the operations to identify the first one or more words in the received text data include at least one operation to:
    determine that the first one or more words are missing from a list of common words.

14. The computing device of claim 1, wherein the second one or more words are neighbors to the first one or more words.

15. The computing device of claim 1, wherein the threshold is user configurable.

16. The computing device of claim 1, wherein the rarity score of the first one or more words is determined by a comparison of the first one of more words with a stored word rarity list that comprises word rarity scores.

17. A method to provide information, the method comprising:
    receiving text data related to content;
    identifying a first one or more words in the received text data;
    indicating the first one or more words as a first search term, wherein a rarity score of the first one or more words meets a first threshold;
    receiving a first one or more search results of a first search performed with the first search term;
    determining whether a number of the first one or more search results meets a second threshold for a received number of first one or more search results;
    in response to a determination that the number of the first one or more search results fails to meet the second threshold for the received number of first one or more search results:
       identifying a second one or more words in the received text data;
       indicating a combination of the first one or more words and the second one or more words as a second search term; and receiving a second one or more search results of a second search performed with the second search term; and sending information related to at least a portion of the first one or more search results or at least a portion of the second one or more search results.

18. The method of claim 17, wherein the sending information related to the at least the portion of the first one or more search results or the at least the portion of the second one or more search results comprises sending a link to additional information regarding the at least the portion of the first one or more search results or the at least the portion of the second one or more search results.

19. A computing device, comprising:
a processor; and
a non-transitory computer-readable storage medium coupled to the processor and having stored thereon computer executable instructions that are executable by the processor,
wherein the computer executable instructions, in response to execution by the processor, cause the processor to perform or control performance of operations comprising:
identify received text data related to content;
identify a first two or more words in the received text data;
indicate the first two or more words as a first search term;
identify a received first one or more search results of a first search performed with the first search term;
determine whether a number of the first one or more search results meets a threshold for a received number of first one or more search results;
in response to a determination that the number of the first one or more search results fails to meet the threshold for the received number of first one or more search results:
identify a second one or more words in the first two or more words, wherein the second one or more words are neighbors to the first two or more words in an inference term table;
remove the second one or more words from the first two or more words to form a second search term; and
identify a received second one or more search results of a second search performed with the second search term; and
send information related to at least a portion of the first one or more search results or at least a portion of the second one or more search results.

20. A method to provide information, the method comprising:
receiving text data related to content;
identifying a first two or more words in the received text data;
indicating the first two or more words as a first search term;
receiving a first one or more search results of a first search performed with the first search term;
determining whether a number of the first one or more search results meets a threshold for a received number of first one or more search results;
in response to a determination that the number of the first one or more search results fails to meet the threshold for the received number of first one or more search results:
identifying a second one or more words in the first two or more words, wherein the second one or more words are neighbors to the first two or more words in an inference term table;
removing the second one or more words from the first two or more words to form a second search term; and
receiving a second one or more search results of a second search performed with the second search term; and
sending information related to at least a portion of the first one or more search results or at least a portion of the second one or more search results.

* * * * *